United States Patent
Hadba et al.

(10) Patent No.: US 7,020,357 B2
(45) Date of Patent: Mar. 28, 2006

(54) COUPLING DEVICE FOR AN ELECTRONIC DEVICE

(75) Inventors: Amer Hadba, Round Rock, TX (US); Jason M. Lau, Austin, TX (US); John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/404,625

(22) Filed: Apr. 1, 2003

(65) Prior Publication Data

US 2004/0197047 A1    Oct. 7, 2004

(51) Int. Cl.
 *G02B 6/26* (2006.01)
 *G02B 6/42* (2006.01)

(52) U.S. Cl. ......................... 385/17; 439/638

(58) Field of Classification Search .............. 385/17, 385/55, 59; 439/76.1, 101, 638
See application file for complete search history.

(56) References Cited

U.S. PATENT DOCUMENTS

| | | | | |
|---|---|---|---|---|
| 4,801,920 A | * | 1/1989 | Ohba et al. ................ 345/78 |
| 5,870,621 A | * | 2/1999 | Walsh et al. ............... 712/32 |
| 6,217,228 B1 | * | 4/2001 | Samela et al. .............. 385/59 |
| 6,687,775 B1 | | 2/2004 | Bassett ...................... 710/77 |
| 6,702,620 B1 | | 3/2004 | Lynch et al. ............... 439/638 |
| 6,721,819 B1 | | 4/2004 | Estakhri et al. ............. 710/11 |
| 6,743,054 B1 | * | 6/2004 | Wu .......................... 439/638 |
| 6,790,079 B1 | * | 9/2004 | Berens et al. .............. 439/534 |
| 6,845,420 B1 | | 1/2005 | Resnick ..................... 710/303 |
| 2003/0110330 A1 | * | 6/2003 | Fujie et al. ................. 710/36 |
| 2003/0193776 A1 | * | 10/2003 | Bicknell et al. ............ 361/685 |
| 2004/0081179 A1 | | 4/2004 | Gregorcyk, Jr. ............ 370/402 |
| 2004/0103242 A1 | | 5/2004 | Teng ......................... 711/104 |
| 2004/0158669 A1 | | 8/2004 | Weng et al. ............... 711/103 |
| 2004/0162926 A1 | * | 8/2004 | Levy ......................... 710/74 |
| 2004/0197047 A1 | | 10/2004 | Hadba et al. ............... 385/17 |

FOREIGN PATENT DOCUMENTS

DE      33 34 903     *  4/1984

OTHER PUBLICATIONS

"Serial ATA in Servers and Networked Storage".

* cited by examiner

*Primary Examiner*—Hae Moon Hyeon

(57) ABSTRACT

A coupling device for an electronic device having a first connector, and a carrier is disclosed which comprises a second connector having a plurality of connector pins and a coupling unit for coupling the first and the second connector, wherein the first connector has a number of connector pins which are less than the number of pins of the second connector and the excess pins of the second connector are used to provide additional functionality for the device.

8 Claims, 2 Drawing Sheets

COUPLING DEVICE FOR AN ELECTRONIC DEVICE

FIELD OF THE INVENTION

The present invention relates to a coupling device for an electronic device in particular for a SATA hard drive.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include so-called cluster technology. Clustering is most widely recognized as the ability to combine multiple systems in such a way that they provide services a single system could not. Clustering is used to achieve higher availability, scalability and easier management. Higher Availability can be achieved by use of "failover" clusters, in which resources can automatically move between 2 or more nodes in the event of a failure. Scalability can be achieved by balancing the load of an application across several computer systems. Simpler management can be attained through the use of virtual servers, as opposed to managing each individual computer system. For example, a high availability clustering joins together two or more servers to help ensure against system failures including planned shutdowns (e.g., maintenance, backups) and unplanned outages (e.g., system failure, software failure, operator errors). The group of connected systems is known as a cluster. High Performance Computing Cluster (HPCC) combines multiple Symmetric Multi-Processor (SMP) computer systems together with high-speed interconnects to achieve the raw-computing power of classic "big-iron" supercomputers. These clusters work in tandem to complete a single request by dividing the work among the server nodes, reassemble the results and present them to the client as if a single-system did the work. The HPC clusters are used for solving the most challenging and rigorous engineering tasks facing the present era. The parallel applications running on HPC are both numeric and data intensive and require medium to high-end industry standard computing resources to fulfill today's computational needs. Since HPC has such a strong implementation, the demand for it is growing at a tremendous speed and is becoming highly popular in all aspects. Scalable Clusters provide the freedom of adding compute nodes in a cluster in order to increase the joint resources of processing. This can add to the power of computation since processors within a cluster can communicate data more efficiently and hence it also can reduce the average memory access time. This is particularly attractive when running parallel applications.

In modern information handling systems, such as Servers and Network Storage devices the Serial ATA standard will replace the current parallel ATA interface. Serial ATA (SATA) is a point-to-point connection and allows multiple ports to be aggregated into a single controller that is typically located either on the motherboard or as an add-in, RAID card. Through backplanes and external enclosures, Serial ATA will be deployed in high-capacity server and networked-storage environments such as the above described cluster systems. However, the SATA backplane interface connector is not as robust as the other connectors because its primary usage is designed for internal use within a computer system. External storage systems, in particular, for cluster systems have to use this type of connection when using SATA hard drives. Therefore, multiple connection disconnection operation might affect the reliabilty of the connection. Furthermore, the connector pins of SATA as currently defined do not allow for dual port support when the connector is installed directly on the backplane of a system. Therefore, failover and load balancing functionality cannot be implemented. These functions generally allow the control and access of one device by multiple controlling devices as mentioned above.

SUMMARY OF THE INVENTION

Therefore, a need for an improved connection for SATA systems exists. To provide an improved connection the present invention This object can be achieved by a coupling device for an electronic device having a first connector, having a carrier comprising a second connector having a plurality of connector pins and a coupling unit for coupling the first and the second connector, wherein the first connector has a number of connector pins which are less than the number of pins of the second connector and the excess pins of the second connector are used to provide additional functionality for the device.

The coupling unit may comprise a multiplexer configuration. The electronic device can be a SATA hard drive, the first connector can be a SATA connector and the second connector can be a fiber channel connector. The fiber channel connector may be used to couple a first or a second SATA channel and the multiplexer configuration can be controlled to couple the first second SATA channel with the SATA connector. The multiplexer configuration can further provide a loop back coupling of the first and second SATA channel. The device may comprises means for mounting the device to the electronic device. The means for mounting may comprise a plurality of screws. The means for mounting can be at least partly integrated in the first means for electrical connection. The first means can be provided on one side of the carrier and the second means can be provided on the opposite side. The carrier can be a printed circuit board. The printed circuit board may carry all components necessary to couple the first means with the second means. A voltage regulator can be provided for supplying a supply voltage to the components and wherein the supply voltage is received from one of the excess pins of the second connector.

The object can in particular be achieved by a SATA hard drive comprising a SATA connector, an external carrier, a second connector having a plurality of connector pins, and a coupling unit for coupling the SATA connector and the second connector, wherein the SATA connector has a number of connector pins which are less than the number of pins of the second connector and the excess pins of the second connector are used to provide additional functionality for the device.

The second connector can be a fiber channel connector. The fiber channel connector can be used to couple a first and a second SATA channel and the multiplexer configuration can be controlled to couple the SATA connector with either the first or second SATA channel provided by the second connector. The multiplexer configuration can further provide a loop back coupling of the first and second SATA channel. The carrier may comprise means for mounting the device to the SATA hard drive. The means for mounting may comprise a plurality of screws. The means for mounting may be at least partly integrated in the first means for electrical connection. The SATA connector can be provided on one side of the carrier and the second connector can be provided on the opposite side. The carrier can be a printed circuit board. The printed circuit board may carry all components necessary to couple the SATA connector with the second connector. A voltage regulator can be provided for supplying a supply voltage to the components and wherein the supply voltage is received from one of the excess pins of the second connector.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
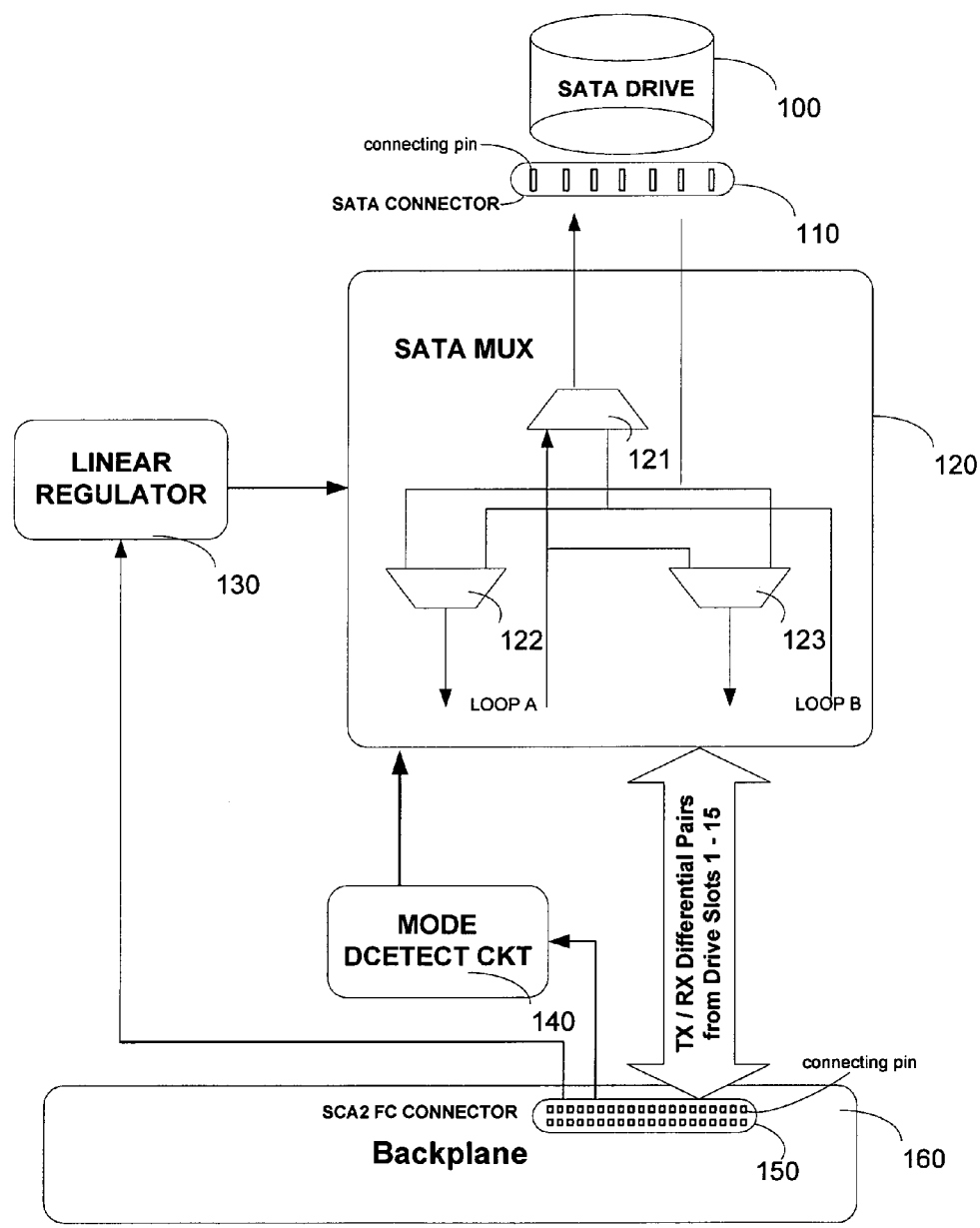
FIG. 1 is a block diagram of a interface directly coupled with a SATA device. system including a server and a plurality of sub-systems.
Figure 2A:
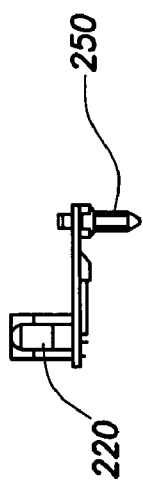
FIG. 2A–D are side, front, and back views of a board including the interface according to the present invention.
Figure 2B:
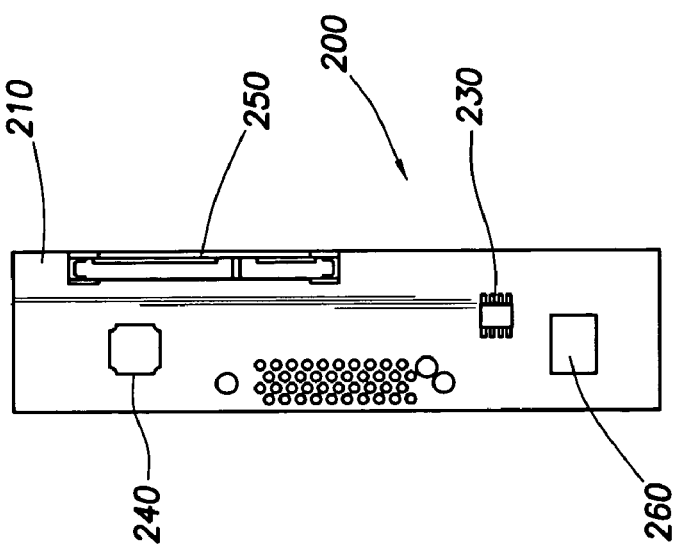
Figure 2C:
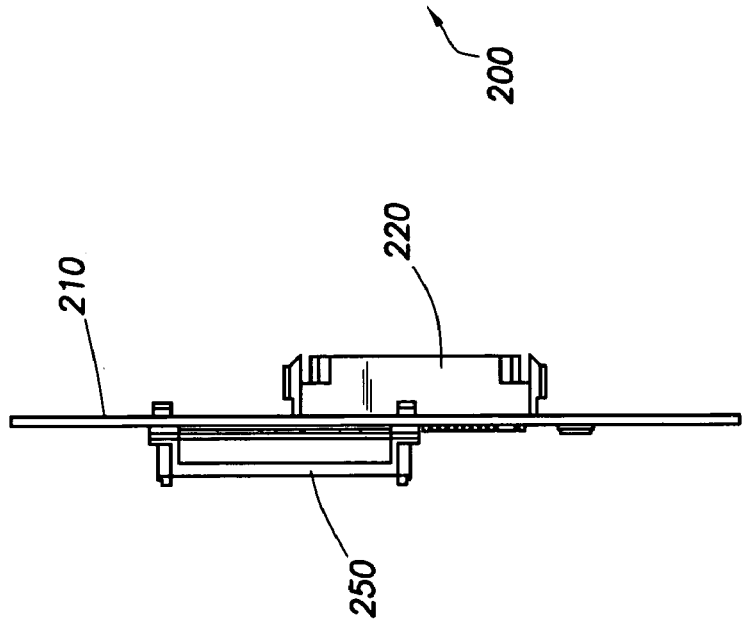
Figure 2D:
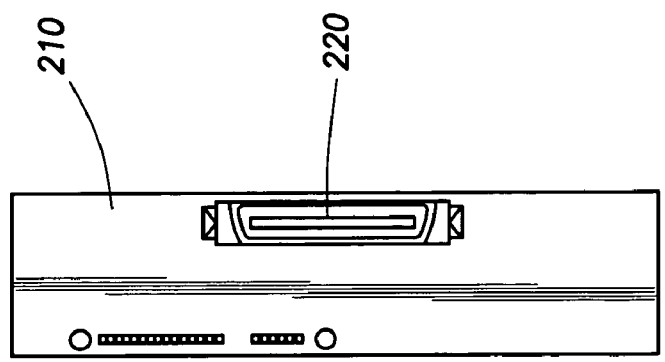

Turning to the drawings, exemplary embodiments of the present application will now be described. FIG. 1 shows a block diagram of an interface connector that allows to couple a SATA drive through a rugged fiber channel connector within an information handling system wherein the hard drive uses the less rugged SATA interface. SATA connections usually need only four single lines, two for sending and two for receiving signals. The fiber channel connecter provides a plurality of connections in excess of the four lines of SATA. Thus, in addition, according to the present invention, the fiber channel connector can be used to provide two separate SATA channels. Thus, according to an embodiment of the present invention, the SATA drive can be coupled within a cluster arrangement in which two systems will have access to the same drive. Furthermore, additional signals to control the switching between the SATA channels can be transmitted through a fiber channel connector.

A hard disk drive 100 having a serial ATA interface with a serial ATA connector 110 is directly coupled with a serial ATA coupling circuit 120. Three multiplexers each switching two signals according to the SATA connection standard are provided. To this end, the exemplary coupling circuit 120 comprises a first multiplexer 121 whose output is coupled with the two input lines of the SATA connector 110. The two output lines of the SATA connector 110 are coupled with the first input of a second multiplexer 122 and the second input of a third multiplexer 123. The output the second multiplexer 122 is coupled with the output of the first channel output Loop A. The output of the third multiplexer 123 is coupled with the output of the second channel output Loop B. The input of the first channel Loop A is coupled with the first input of the first multiplexer 121 and the first input of the third multiplexer 123. In a similar way, the input of the second channel Loop B is coupled with the second input of the first multiplexer 121 and the second input of the second multiplexer 122. Loop A and Loop B are coupled through respective fiber channel connectors 150 which are provided within the a common serial backplane 160 of, for example, a storage array. Furthermore, an independent voltage supply 130 is shown in FIG. 1 to provide a supply voltage for the multiplexers in the coupling circuit 120. This independent voltage supply can comprise a linear voltage regulator 130 which receives a standard DC supply voltage of 5V and generates a regulated DC voltage of, for example, 3.3V. The independent voltage can be supplied through an additional connector pin in a fiber channel connector that is not used. To control the operation of the multiplexers within the coupling circuit 120 a mode detect circuit 140 is provided. The mode detect circuit 140 can, for example, control the status of the multiplexers depending on control signals provided through the fiber channel connector 150 and/or by analyzing a specific setting of respective switches provided in the backplane for setting a specific type of operation. To this end, a special mode switch in the backplane can define different modes of operation of the entire storage system. The switch can pull down or pull up specific indicator lines which also are fed through the fiber channel connector to each coupling circuit 120 to indicate the mode of operation. For example, if one indicator line is used, two different operating modes can be selected, if two lines are used, up to four different operating modes can be selected, etc.

During a first or normal mode the interface couples either Loop A or Loop B with the SATA connector 110. A host controller in the system connecting through Loop A or Loop B sends respective control signals which can be decoded by the mode detection circuit 140. The mode detection circuit then controls the multiplexers to couple the four lines of the SATA connector with either Loop A or Loop B supplied by the fiber channel connector. If Loop A is selected, multiplexer 121 and multiplexer 122 are controlled to select their first input, respectively. Thus, Loop B remains inactive and data is transferred through Loop A and the SATA connector in a normal fashion. If Loop B is selected, multiplexer 121 and multiplexer 123 are controlled to select their second inputs, respectively. Thus, Loop A remains inactive and data is transferred through Loop B and the SATA connector in a normal fashion.

During a second mode, the cluster mode, multiple drives are present in a plurality of slots. One controller usually controls drives through Loop A and a second controller controls drives through Loop B. In this mode the drive in the last slot is not used. However, a controller to controller communications channel is still needed for clustering in this slot. This communication can be created by coupling Loop A to Loop B. The controllers pass cluster-specific information back and forth through A and B and the drive is not used. This specific mode can be detected by the mode detection circuit 140 according to the setting of the mode switch on the backplane. To this end, the mode detection circuit compares the ID of the respective drive which is provided by the backplane through hardwired identification in the fiber channel connector 150 to determine whether this is the last drive in the unit. When this mode has been detected and the drive is the last drive, for example drive 15, in the unit, multiplexer 122 is controlled to select the second input and thus the output of Loop B is coupled with the input of Loop A. Furthermore, multiplexer 123 is controlled to select the first input. Thus, the output of Loop A is coupled with the input of Loop B. As stated above, the respective SATA drive is not used in this configuration. Also as stated above, the control over the multiplexers is usually done by the host controllers, except in cluster mode, where it is set in a loop-back mode by this auto-detection circuit 140.

Other modes of operation can be included depending on the capabilities of the respective controllers and/or drives that are implemented within the storage unit. Even though the coupling circuit has been described using three multiplexers, other configurations can be used, for example, to multiplex the SATA port of a hard drive or the respective coupling of an electronic device. Therefore, the present invention is not limited to the specific exemplary embodiment of the multiplexers shown in coupling circuit 120. Any other suitable coupling circuit can be used. For example, a plurality of tri-state buffers can be used to achieve a similar functionality. The coupling circuit can also be expanded to provide even more functionality depending on the requirement of the respective system.

FIG. 2A–D shows an exemplary mechanical embodiment of the connecting device 200 according to the present invention. In FIG. 2A–D a printed circuit board 210 operates as a carrier and comprises the SATA connector 250 on one side and the fiber channel connector 220 on the respective other side. The printed circuit board also comprises all necessary components for the coupling and their interconnection with each other and the connectors. For example, a first integrated circuit 240 may comprise all multiplexers and a second integrated circuit 230 may comprise the mode detector 140, for example, in form of a decoder. In addition, a voltage regulator 260 can be provided to supply the integrated circuits with the necessary supply voltage supplied by the fiber channel connector. The main voltage will be provided from an voltage supply source within the storage unit through one of the fiber channel connector pins. Any other suitable type of carrier can be provided, for example, a metal sheet can be used as a carrier and the control electronic can be provided on a separate circuit board mounted to the carrier. The connecting device 200 in form of such a small board can be attached, for example, with 2 screws to a hard disk carrier. However, other suitable mounting means can be provided. For example, integrated screws within the SATA connector 250 can be used to at least partly provide a coupling of the device with the SATA drive carrier. The SATA drive carrier will house usually a single SATA drive. The other side of the connecting device 200 provides a rugged fiber channel connector which can be unplugged and plugged many times in a secure manner to provide a solid connection to a backplane and in addition provides for additional signals necessary to run different operating modes. Therefore, one connecting device is needed for each SATA drive which is to be used in multiple SATA drive system.

The connecting device 200 stays permanently connected with the respective electronic device, such as the SATA hard drive. The first connector, here the SATA connector, has been primarily designed to provide a coupling within a computer which in very rare occasions has to be disconnected once the system has been assembled. Therefore, this type of connection does not provide for a rugged handling as other connectors. The second connector provides for a more secure/rugged connection in terms of allowing multiple disconnections/connections by plugging in and out a respective connector without affecting the connection proper. In modern information handling systems, such as servers, storage area networks etc., disconnections/connections will happen more frequently than in a personal computer system and, therefore, the SATA interface connectors do not provide a rugged connector as for example the fiber channel connector. In addition, the multiplexer circuit which couples the two type of connectors allows for a very flexible handling of the coupling of the two interface types, such as a selectable two channel mode and a loopback function in which the incoming signals from a first channel are looped back through the second channel and vice versa. To this end, a different connector type providing more connecting pins is used according to the present invention. Even though, the exemplary embodiment uses a fiber channel connector other connectors can be used that provide connections in excess to a simple SATA connection.

Any other electronic device which comprises a first connector and for which a user prefers a second type of connector can be improved by the present invention. A particular interface can be integrated within a carrier board which couples two types of connectors and can be permanently attached to the electronic device. The first connector will then permanently be connected with the respective connector of the device whereas the second connector provides for the desired type of connection. In addition, more functionality can be provided by using a second type of connector with a number of connecting pins in excess of the number of connecting pins of the first type. For example, a plurality of channels can be provided wherein the particular interface selects one of the channels to connect it to the respective first connector. Thus, the first connector can be quasi multiplied within the second connector.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A coupling device for coupling a first electronic device to a second electronic device, comprising:
    a first connector sized to be coupled to the first device and having a plurality of connector pins;
    a second connector sized to be coupled to the second device and having a plurality of connector pins;
    a coupling unit comprising a multiplexer for providing multiple channels between the first connector and the second connector;
    wherein the first connector has a number of connector pins that are fewer in number than the number of connector pins of the second connector, and wherein the excess pins of the second connector are used to provide additional functionality for the second electronic device.

2. The coupling device of claim 1, wherein the first electronic device is a Serial Advanced Technology Attachment (SATA) hard drive and the second electronic device is a fibre channel device.

3. The coupling device of claim 2
    wherein the fibre channel device provides for a first external SATA coupling and a second external SATA coupling;
    wherein the multiple channels of the coupling unit comprise a first SATA channel and a second SATA channel and wherein the multiplexer of the coupling unit is operable to couple either the first or the second SATA channel coupling with the first or second external SATA coupling of the fibre channel device.

4. The coupling device of claim 3 wherein the coupling device is operable to couple the first SATA channel to the second SATA channel in a loop back arrangement.

5. The coupling device of claim 1, further comprising means for mounting the coupling device to the first electronic device and the second electronic device.

6. The coupling device of claim 5, wherein the means for mounting comprises a plurality of screws.

7. The coupling device of claim 5, wherein the means for mounting are at least partly integrated in the coupling unit.

8. The coupling device of claim 1, wherein the first connector is located on one side of the coupling unit and the second connector is located on the opposite side of the coupling unit.

* * * * *